No. 851,509. PATENTED APR. 23, 1907.
W. C. FISHER.
HOOK.
APPLICATION FILED JAN. 2, 1906.
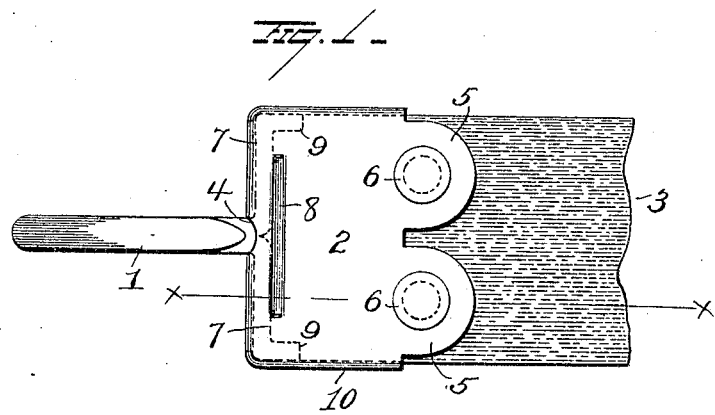
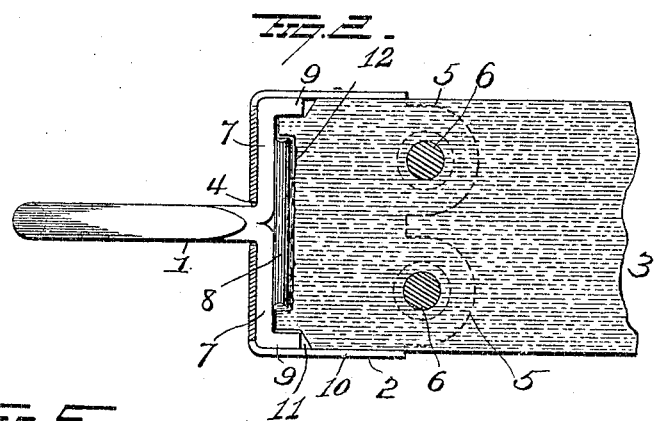
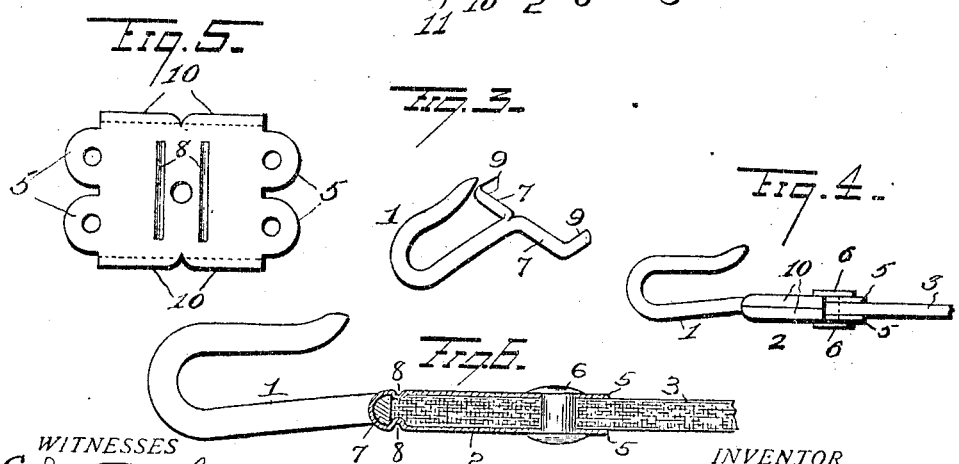
WITNESSES
E. J. Nottingham
G. F. Downing
INVENTOR
W. C. Fisher
By H. A. Seymour
Attorney

UNITED STATES PATENT OFFICE.

WILLIAM C. FISHER, OF MIDDLETOWN, CONNECTICUT.

HOOK.

No. 851,509.  Specification of Letters Patent.  Patented April 23, 1907.

Application filed January 2, 1906. Serial No. 294,159.

*To all whom it may concern:*

Be it known that I, WILLIAM C. FISHER, a resident of Middletown, in the county of Middlesex and State of Connecticut, have invented certain new and useful Improvements in Hooks; and I do hereby declare the following to be a full, clear, and exact description of the invention, such as will enable others skilled in the art to which it appertains to make and use the same.

My invention relates to improvements in hooks, the object of the invention being to provide an improved construction of hook which will be rigidly held in its keeper when the latter is secured to a belt or strap end or other device, and permit a good length of end to be confined in the keeper so that the securing rivets may be located some distance from the end of the belt or other device and thereby provide a better and more lasting juncture of the hook with the belt.

The hook is especially designed for belt ends and other parts of soldier's equipment, but may be applied to other uses and I do not restrict myself to any particular use.

With these objects in view, the invention consists in certain novel features of construction and combinations and arrangements of parts as will be more fully hereinafter described and pointed out in the claims.

In the accompanying drawings, Figure 1 is a view in elevation illustrating my improvements. Fig. 2 is a view in section. Fig. 3 is a view of the hook removed. Fig. 4 is an edge view of the structure shown in Fig. 1. Fig. 5 is a view of the sheet metal blank from which the keeper is made. Fig. 6 is a longitudinal sectional view on the line x—x of Fig. 1.

1 represents the wire of which my improved hook is made and 2 the keeper to secure the hook to a belt or strap 3. The keeper 2 is made from a sheet metal blank, folded upon itself to enclose the end of the belt or strap 3 and having flanges 10 at its side edges to enclose and confine the side edges of the belt or strap. The folded end of the keeper is provided with a central opening 4 to receive the rod or wire 1, the outer end of which latter being bent into hook form as shown. The ends of keeper 2 are made with rounded extensions 5 having aligned openings therein to receive rivets 6 passed through the belt or strap to firmly secure the keeper and hook in place.

The hooked end of rod or wire 1 is preferably sharpened and the other end of the rod or wire is projected through the opening 4 into the keeper and this end of the rod or wire is split longitudinally forming two rigid arms or members 7, 7, which members 7, 7 are bent at right angles and extend in opposite directions away from each other and rest in the folded end of the keeper, and the latter is made with internal ribs or flanges 8 (preferably by stamping) to confine and positively lock the bent members 7, 7, in the folded edge of the keeper when the latter is clamped on the end of the belt or strap. The extreme ends of members 7, 7, are bent at right angles forming lugs 9, 9, extending rearward in the side portions of the keeper and prevent any lateral movement of the hook.

By splitting the rod or wire, it occupies but comparatively small space, not to mention the fact that it economizes material, and allows a good length of strap end to be confined in the keeper and disposes the rivets far enough from the end of the strap to insure a firm and lasting connection, and the hook will be rigidly held against longitudinal or lateral movement when the keeper is clamped on the strap or belt end To further facilitate the fastening of the keeper to the strap a considerable distance from the end of the latter, said strap is notched as at 11, so as to cause it to be disposed inside the lugs 9, and said strap is also recessed as at 12 to fit the ribs 8.

Slight changes might be made in the manner of bending the split end of the rod or wire and other changes might be made in the general form and arrangement of parts described within the scope of the appended claims without departing from my invention. Hence, I do not restrict myself to the precise details set forth but consider myself at liberty to make such slight changes and alterations as fairly fall within the spirit and scope of my invention as defined in the appended claims.

Having fully described my invention, what I claim as new and desire to secure by Letters-Patent is:—

1. The combination of a sheet metal keeper having an opening at one end, and a hook passing through said opening and having lateral arms disposed within the keeper, the keeper having a projection engaging said arms.

2. The combination of a keeper having an opening at one end, a hook passing through said opening and having laterally projecting arms at one end disposed within the keeper, and lugs at the ends of said arms disposed at right angles to said arms and lying against the side edges of the keeper.

3. The combination with a hook having laterally projecting arms at one end and a sheet metal keeper embracing said arms and having an opening for the passage of the wire of the hook, and means carried by the keeper and positively securing the arms of the hook within the keeper.

4. The combination with a hook having laterally projecting arms at one end of its shank and a keeper embracing said arms and having an opening for the passage of the shank of the hook, said keeper provided with a rib engaging said arms.

5. The combination with a sheet metal keeper bent upon itself and having a hole in its folded portion and having cooperating side flanges, of a hook having laterally projecting arms disposed in the folded end of the keeper, the shank of said hook projecting through the opening in the folded portion of the keeper, lugs at the ends of said arms disposed against the side flanges of the keeper, and a belt or strap having its end secured in the keeper and having its free extremity terminating between the lugs on the laterally projecting arms of the hook.

In testimony whereof, I have signed this specification in the presence of two subscribing witnesses.

WILLIAM C. FISHER.

Witnesses:
   E. KENT HUBBARD, Jr.,
   H. S. PRATT.